(12) United States Patent
Pintos et al.

(10) Patent No.: US 7,084,833 B2
(45) Date of Patent: Aug. 1, 2006

(54) ANTENNA WITH POLARIZATION DIVERSITY

(75) Inventors: Jean-Francois Pintos, Bourgbarre (FR); Jean-Luc Robert, Betton (FR); Olivier Mocquard, Rennes (FR); Ali Louzir, Rennes (FR); Franck Thudor, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/932,959

(22) Filed: Sep. 2, 2004

(65) Prior Publication Data
US 2005/0057419 A1 Mar. 17, 2005

(30) Foreign Application Priority Data
Sep. 12, 2003 (FR) .................................. 03 10772

(51) Int. Cl.
*H01Q 3/24* (2006.01)
(52) U.S. Cl. ........................ 343/876; 343/850; 343/853
(58) Field of Classification Search ......... 343/700 MS, 343/795, 850, 853, 876, 756
See application file for complete search history.

(56) References Cited

U.S. PATENT DOCUMENTS

| 4,737,793 | A | * | 4/1988 | Munson et al. ............. 342/361 |
| 4,958,165 | A | * | 9/1990 | Axford et al. ............. 343/770 |
| 5,894,287 | A |   | 4/1999 | An et al. |
| 6,483,477 | B1 |   | 11/2002 | Plonka |
| 6,650,301 | B1 | * | 11/2003 | Zimmerman ................ 343/803 |
| 2003/0214438 | A1 | * | 11/2003 | Hatch et al. ......... 373/700 MS |

FOREIGN PATENT DOCUMENTS

| EP | 1 289 055 | 3/2003 |
| EP | 1 345 419 | 9/2003 |

OTHER PUBLICATIONS

Search Report

* cited by examiner

*Primary Examiner*—Hoang V. Nguyen
(74) *Attorney, Agent, or Firm*—Joseph J. Laks; Robert D. Shedd; Brian J. Cromarty

(57) ABSTRACT

The antenna, particularly for portable televisions, comprises two ports coupled to a radiating element (11), the two ports being placed on the radiating element at 90° to each other and at 45° relative to a horizontal plane. The two ports are linked to a broadband switching and phase shifting circuit controlled in order to supply a polarization diversity signal as output.

17 Claims, 4 Drawing Sheets

ANTENNA WITH POLARIZATION DIVERSITY

The present invention relates to an antenna with polarization diversity particularly for portable televisions. The invention is relevant in particular to the future deployment of the TAT (terrestrial digital television) network.

BACKGROUND OF THE INVENTION

Despite the robustness of OFDM (Orthogonal Frequency Division Multiplex) multi-carrier modulation compliant with the DVB-T (Digital Video Broadcast Terrestrial) standard chosen for the transmission of digital channels, measurement campaigns have revealed reception problems, particularly in the context of portable television reception.

Unlike an analogue signal in which the degradation is gradual, a fading phenomenon affecting the digital signal at a given time, over a given area, generates a rapid transition from quality reception to total loss of signal. The result is that the launch of the DVB-T programme is dependent on devising technical solutions for antennas to allow quality reception.

In the context of television reception in the UHF band, the antennas currently developed provide a directivity of a few dB (decibels), with the choice of polarization being entirely manual. These large and rather impractical antennas offer limited reception quality.

BRIEF SUMMARY OF THE INVENTION

The invention proposes a small and inexpensive antenna, particularly for portable televisions, providing reliable and quality reception by polarization diversity.

To that end, the invention is an antenna, particularly for portable televisions. The antenna comprises two ports coupled to at least one radiating element, the two ports being placed on the radiating element at 90° to each other and at 45° to a horizontal plane. The two ports are linked to a broadband switching and phase shifting circuit controlled to supply a polarization diversity signal as output.

With this arrangement, it is easy to obtain a fourth-order polarization diversity (horizontal polarization, vertical polarization, polarizations at +/−45°) to improve the antenna's link budget and, above all, to avoid fading of the reception signal in a given direction. It is also possible to obtain a higher order polarization diversity by introducing a phase shift at the ports that is different from 0 or 180°.

The antenna according to the invention may also have the following features:

- the antenna comprises two radiating elements in the form of two coplanar radiating half-discs, the edges of which are oriented at 90° to each other, each port comprising a probe extending along the edge of a half-disc;
- the antenna comprises two radiating elements in the form of two radiating spheres, the axes of revolution of which are oriented at 90° to each other, each port comprising a probe extending along the axis of revolution of a radiating sphere;
- the radiating element takes the form of a radiating disc and in which the two ports respectively comprise two probes which extend radially to the circumference of the radiating disc, at 90° to each other;
- each radiating element in the form of a half-disc or sphere is coupled to a cone-shaped ground plane, the interior volume of the cones possibly being used to house the switching and phase shifting circuit, among other things;
- the radiating element in the form of a disc is coupled to a ground plane formed by two discs that are coplanar to each other and with the disc forming the radiating element.

In one particular embodiment of the invention, the radiating element is divided into two mechanically separate parts designed to be incorporated respectively in the right and left sides of a television in order to produce spatial diversity.

According to a further feature of the invention, an antenna advantageously comprises a balanced low-noise amplifier linked to the broadband switching and phase shifting circuit via a matching circuit designed to offset matching losses in the bottom part of the antenna's receive spectrum resulting from the miniaturization of the antenna. This matching circuit therefore enables the size of an antenna as described above to be reduced further, while retaining good performance from the radiofrequency point of view, so making it even more functional in its application to indoor portable televisions for terrestrial digital reception. A simple implementation of the matching circuit comprises a high-pass network designed to control the matching of the low-noise amplifier in the antenna's degraded frequency domain and a passive phase shifting circuit designed to control the maximum amplitude of mismatches throughout the antenna's useful frequency band, the passive phase shifting circuit possibly consisting of a microstrip line. Moreover, the balanced low-noise amplifier advantageously comprises hybrid couplers at the input and at the output in order to isolate the matching and noise figure parameters.

BRIEF DESCRIPTION OF THE DRAWINGS

A number of exemplary embodiments of the invention are illustrated below in greater detail and with reference to the appended drawings which are supplied only as non-limiting examples.

DESCRIPTION OF PREFERRED EMBODIMENTS

An antenna according to the invention comprises two ports coupled to a radiating element in such a way that they are placed on the radiating element at 90° to each other and at 45° to a horizontal plane which enables a polarization diversity signal to be supplied via a controlled broadband switching and phase shifting means (electronic circuit) linked to the ports.

Figure 1:
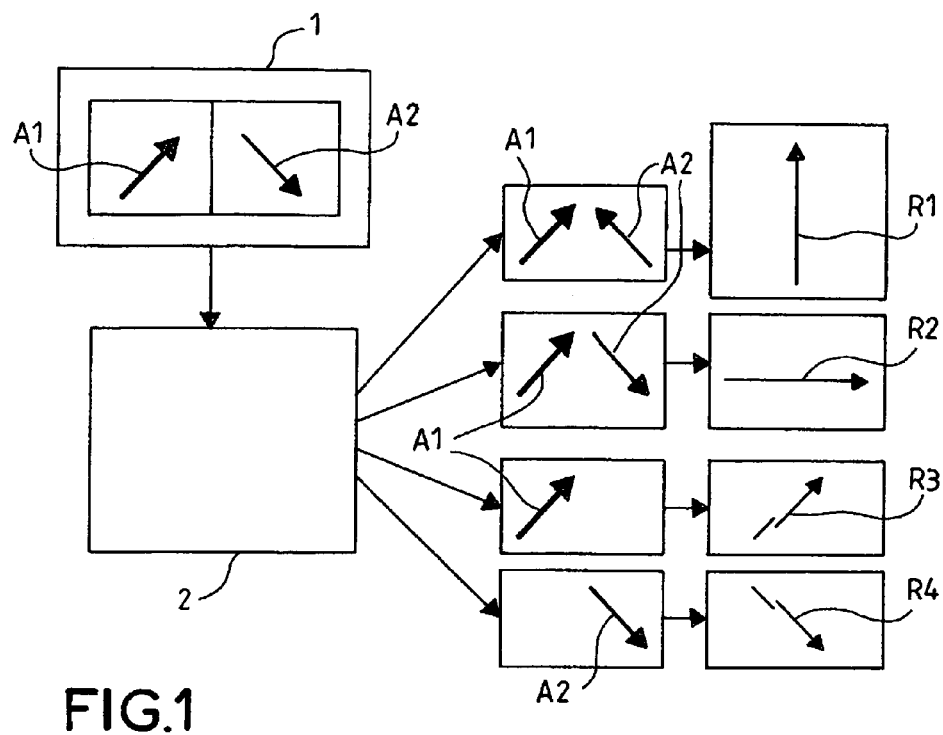
FIG. 1 very schematically shows the principle of polarization diversity obtained with an antenna according to the invention.

FIG. 1 very schematically shows the signals A1 and A2 produced by the two ports of the antenna according to the invention, each polarized respectively at +45° and −45°. The direction and the inclination of the arrows shown on FIG. 1 represent the orientation of the polarization. The antenna is symbolized by the rectangle 1. These signals A1, A2 are sent to an electronic circuit or broadband switching and phase shifting block 2 designed to be controlled to combine the signals A1 and A2 in such a way as to produce here, selectively, as output, a resultant signal according to four polarization states, vertical, horizontal, +45°, −45° respectively.

At the output of the block 2, it can be seen that if the phase of the signal A1 is unchanged by the block 2 and the signal A2 is phase shifted by 180°, a resultant signal R2 with horizontal polarization is generated at the output with the two ports of the antenna. If the two incoming signals A1 and A2 are maintained without phase shifting or switching in block 2, a resultant signal R1 with vertical polarization is obtained. If the second signal A2 is blocked in the block 2 and the first signal A1 is unchanged in the block 2, a resultant signal R3 polarized at +45° corresponding to the first signal A1 is obtained. Conversely, if the first signal A1 is blocked in the block 2 and the second signal A2 is unchanged in the block 2, a resultant signal R4 polarized at −45° corresponding to the second signal A2 is obtained.

The use of a switching and phase shifting block 2 therefore enables the four main polarization states to be obtained. Obviously, polarizations of an order higher than four can be obtained if the block 2 is designed to provide a phase shift of 90°, for example, on the input signals A1, A2, in order to obtain a circular polarization. Different phase shifts from 0 to 180° inclusive can be used to obtain further different polarizations with the two ports. The switching and phase shifting circuit 2 can easily be produced using electronically controlled line and diode switches.

This polarization diversity can be used to avoid the problems of fading on the receive signal in a given direction and therefore to simply improve the reception quality of an antenna.

FIGS. 2 to 5 show exemplary embodiments of antennas according to the invention. With these antennas, a matching level less than −10 dB can be obtained throughout the antenna's useful bandwidth (470–862 MHz).

Figure 2:
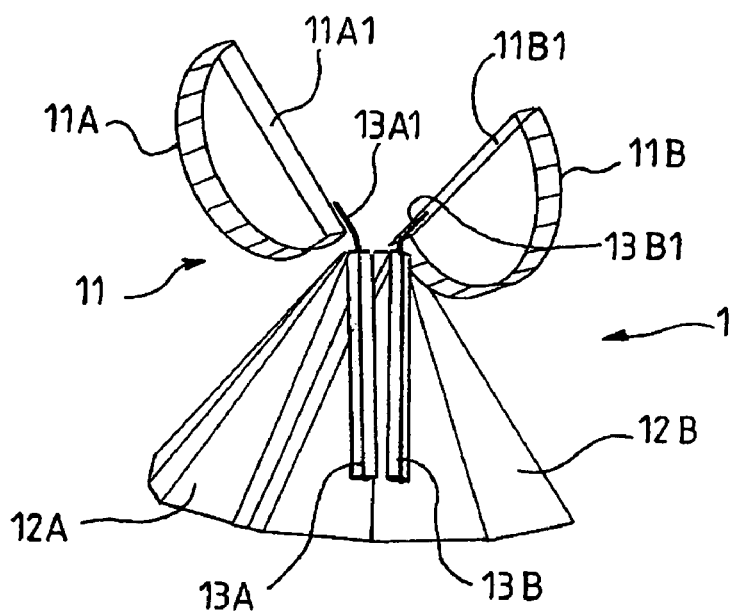
FIG. 2 illustrates a first exemplary embodiment of an antenna according to the invention.

In FIG. 2, the antenna 1 comprises a radiating element 11 in the form of two coplanar half-discs 11A, 11B, the radial edges or sides of which, 11A1, 11B1 respectively, are oriented at 90° to each other and at 45° to a horizontal plane. Each radiating half-disc is coupled to a ground plane, 12A, 12B respectively, via the screening of a coaxial conductor (for example, 50 ohms), 13A, 13B respectively. The free end of the core of each coaxial conductor forms a probe 13A1, 13B1 which is placed in electrical contact with the edge of the half-disc forming the corresponding radiating element, this probe extending along the edge of this radiating element as shown in FIG. 2 in such a way as to obtain the 90° orientation of the two ports of the antenna. Each ground plane linked to a radiating half-disc takes the form of a cone through which a coaxial conductor passes along its axis of revolution. In FIG. 2, it can be seen that the two cones 12A, 12B intersect to form a single piece topped at the tips of the cones by the two radiating half-discs appearing like a pair of ears. The dimensions of the half-discs and the ground planes, and the distance between each half-disc and a ground plane can be modified to provide antenna matching across the UHF bandwidth while retaining a small footprint for the antenna. By way of example, a matching level of −10 dB across the entire 470–862 MHz band has been obtained with an antenna with the following dimensions:

Diameter of each half-disc: 11 cm
Thickness of each half-disc: 4 cm
Height of each conical ground plane: 11 cm
Inclination of each conical ground plane: 45°

The elements 11A, 11B, 12A, 12B can be produced by moulding a plastic in order to obtain hollow plastic bodies having the shape of half-discs and cones. The outer surface of these hollow bodies is then plated to form a radiating surface or a ground plane. An embodiment in foam technology can be used to obtain a lighter antenna. In this case, the elements 11A, 11B, 12A, 12B are produced by hollowing out a foam block, the inner surface of the hollowed out spaces then being plated in a known manner. This antenna construction is simple to manufacture. The electronic switching and phase shifting block 2 can be housed inside the interior volume of the two cones to be linked to the two coaxial conductors 13A, 13B.

Figure 3:
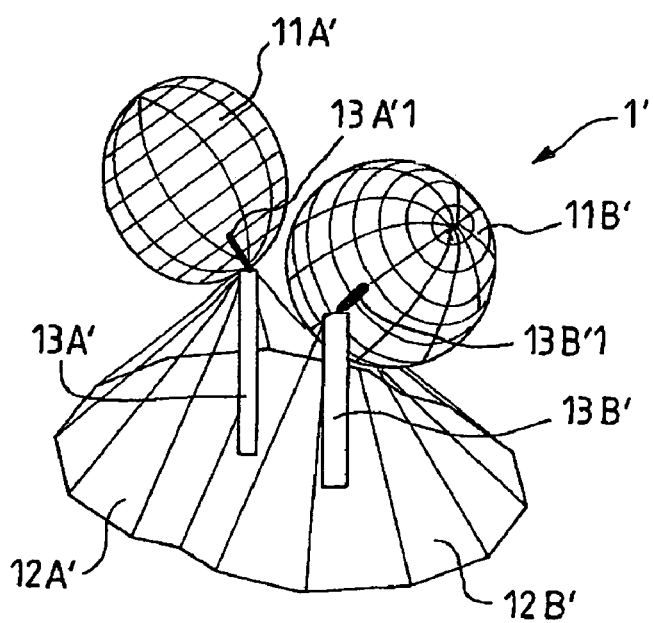
FIG. 3 illustrates a second exemplary embodiment of an antenna according to the invention.

FIG. 3 shows another embodiment of an antenna 1' according to the invention, again with two conical ground planes 12A', 12B' combined into a single piece, but with a radiating element taking the form of two spheres 11A', 11B'. The axes of revolution of the two radiating spheres 11A', 11B' are oriented at 90° to each other and each at 45° to the horizontal plane. The free end of the core of each coaxial conductor 13A', 13B' forms a probe 13A'1, 13B'1 which here extends along the axis of revolution of the corresponding sphere in such a way that the two ports to the radiating element of the antenna are again oriented at 90° to each other. The spheres 11A', 11B' and the conical ground planes 12A' and 12B' can be made by plating corresponding hollow shapes made of moulded plastic or by plating corresponding hollowed-out spaces in a block of foam. With this construction, the switching and phase shifting block 2 can again be installed in the interior volume of the conical ground planes. An antenna 1' has been produced with a matching level of the order of −10 dB across the entire 470–862 MHz frequency band, with the following dimensions:

Diameter of the radiating spheres: 11 cm
Height of each conical ground plane: 11 cm
Inclination of each conical ground plane: 45°.

Figure 4:
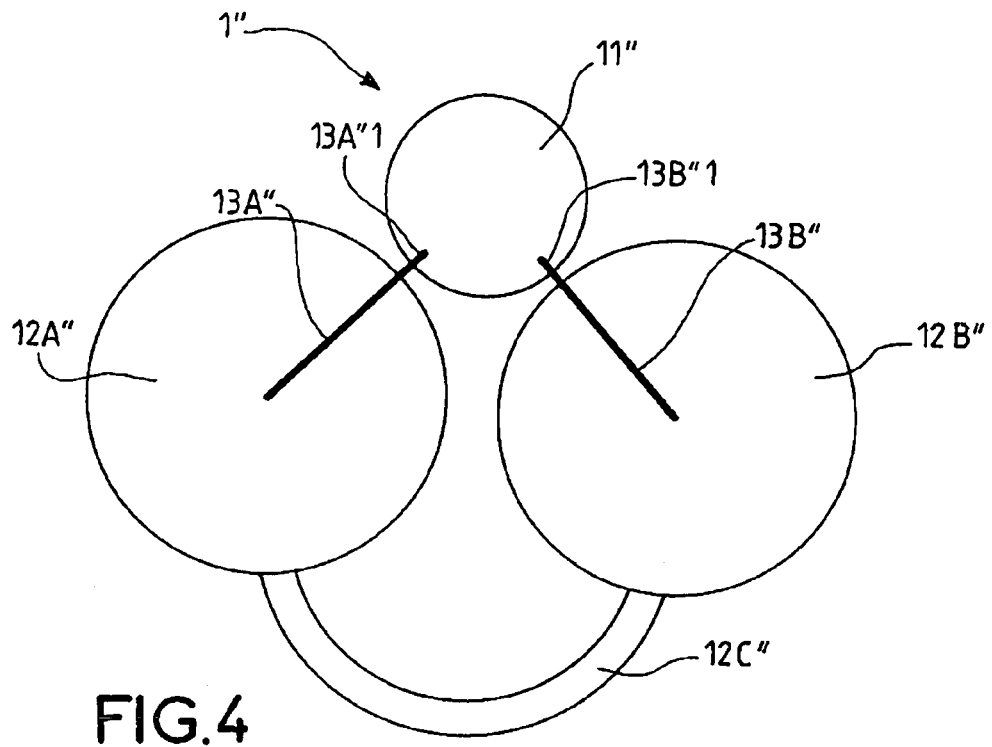
FIG. 4 illustrates a third exemplary embodiment of an antenna according to the invention.

FIG. 4 shows yet another embodiment of an antenna 1" according to the invention comprising a single radiating element in the presence of two ports taking the form of a disc 11" and two ground planes 12A", 12B" in disc form, the ground planes and the radiating element in disc form being coplanar in a triangular arrangement. As can be seen in this figure, the coaxial conductors 13A", 13B" extend radially at 90° to each other respectively in the disc shaped ground planes and the free ends of the cores of these conductors forming the probes 13A"1, 13B"1 come into radial contact with the outer periphery of the disc forming the radiating element 11", forming an angle of 90° to each other and an angle of 45° each to the horizontal plane. With this embodiment, a link arch 12C" must be formed between the two ground planes to run the transmission links to the switching and phase shifting block 2. The ground planes 12A", 12B" must be spaced relative to each other in such a way that field lines can be established between them so as not to disturb the radiation and therefore the matching of the antenna. An antenna has been produced with the following dimensions:

Thickness of the three discs 11", 12A", 12B": 2 cm
Diameter of the disc forming the radiating element: 11 cm Diameter of each disc forming a ground plane: 22 cm Thickness of the link arch: 1 cm.

With this construction, there are still two ports to the radiating element that are at right angles to each other and inclined at an angle of 45° to the horizontal. The elements 11", 12A", 12B" can be made by moulding plastics or in foam technology as described above.

Figure 5:
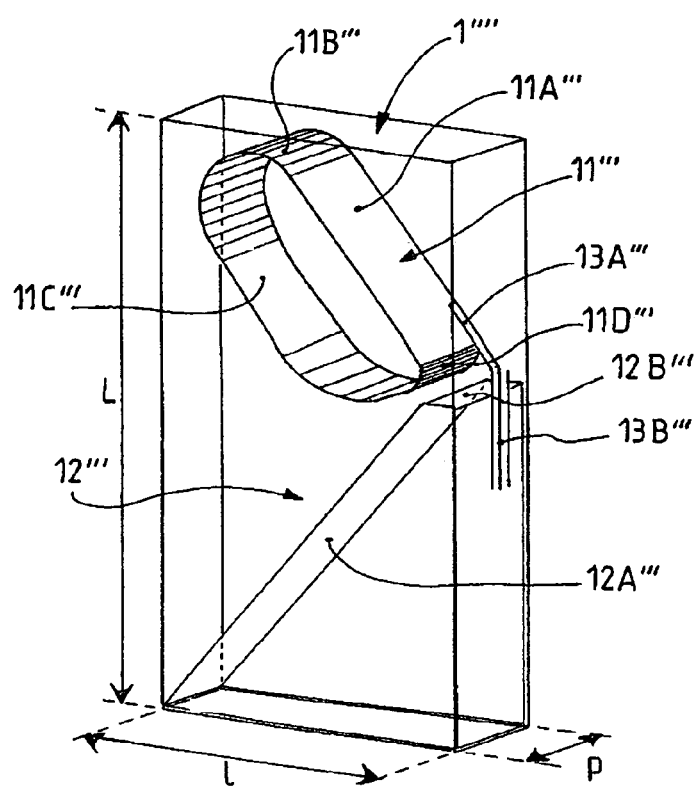
FIG. 5 illustrates a fourth exemplary embodiment of an antenna according to the invention.

FIG. 5 shows yet another embodiment of an antenna 1''' according to the invention which offers a high degree of compactness and with which a spatial diversity can also be implemented with good radiofrequency-related performance characteristics. This antenna is designed in particular to be built into the sides of a portable television since it is divided into two radiating parts that are mechanically separate from each other. FIG. 5 shows a part of the antenna 1''' comprising a radiating element 11''' in the form of a flattened bean and a ground plane 12''' in the form of a trapezium, and these elements 11''' and 12''' can be made by moulding a plastic or by hollowing out a block of foam and plating the appropriate surfaces. As can be seen in FIG. 5, this part of the antenna overall occupies a space defined by a rectangular parallelepiped, the L, W, D dimensions of which are respectively about 21.9 cm, 12.7 cm and 3.2 cm. The radiating element 11''' in the form of an haricot bean includes an annular radiating surface (plated) that has no sharp edges. More specifically, the radiating annular surface of the radiating element 11''' comprises a straight top linear part 11A''' which is inclined at 135° to a horizontal plane, a top linear part in the form of an arc of a circle 11B''' continuing the linear part 11A''', a straight bottom linear part 11C''' virtually parallel to linear part 11A''' and which continues the linear part 11B''' and finally a bottom linear part in the form of an oval arc 11D''' which interconnects linear parts 11C''' and 11A'''.

A conductive probe 13A''' is extended in electrical contact along the top linear part 11A''' making an angle of 45° to the horizontal plane, this probe forming a coupling port to the radiating element 11'''.

The ground plane 12''' linked to the radiating element 11''' takes the form of a trapezium, the top of which is located near to the radiating element 11'''. As can be seen in FIG. 5, the radiating element 11''' and the ground plane 12''' are arranged relative to each other in such a way that the inclined side 12A''' of the ground plane 12''' faces the bottom linear part 11C''' of the radiating element 11'''. The peripheral surface of the ground plane 12''' including the side 12A''' is completely plated apart from an insulating passage 12B''' being left at the top of the trapezium to run a microstrip line 13B''' electrically connected by a spot of solder to the probe 13A''' and intended to be linked to an input of the switching and phase shifting block 2. In an embodiment by moulding a plastic, the structure of the radiating element 11''' and the structure of the ground plane 12''' can be secured by two parallel plastic plates forming two opposing sides of the parallelepiped.

Figure 6:
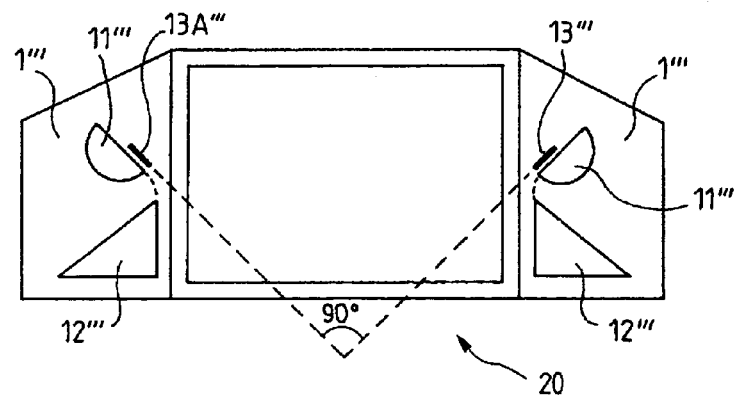
FIG. 6 illustrates a portable television equipped with an antenna according to the invention.

FIG. 6 very schematically shows a portable television 20, the right and left sides of which are fitted respectively with an antenna part such as 1'''. It can be seen in FIG. 5 that the relative orientation of the radiating element 11''' and the ground plane 12''' on the left side of the television (this orientation being identical to that appearing on FIG. 5) is symmetrical to the relative orientation of the radiating element 11''' and of the ground plane 12''' on the right side of the television, such that the probes 13A''' respectively of the antenna part 1''' on the right side and of the antenna part 1''' on the left side of the television are oriented at 90° to each other and each at 45° to the horizontal plane, enabling both spatial diversity and polarization diversity to be produced as described above.

Figure 7:
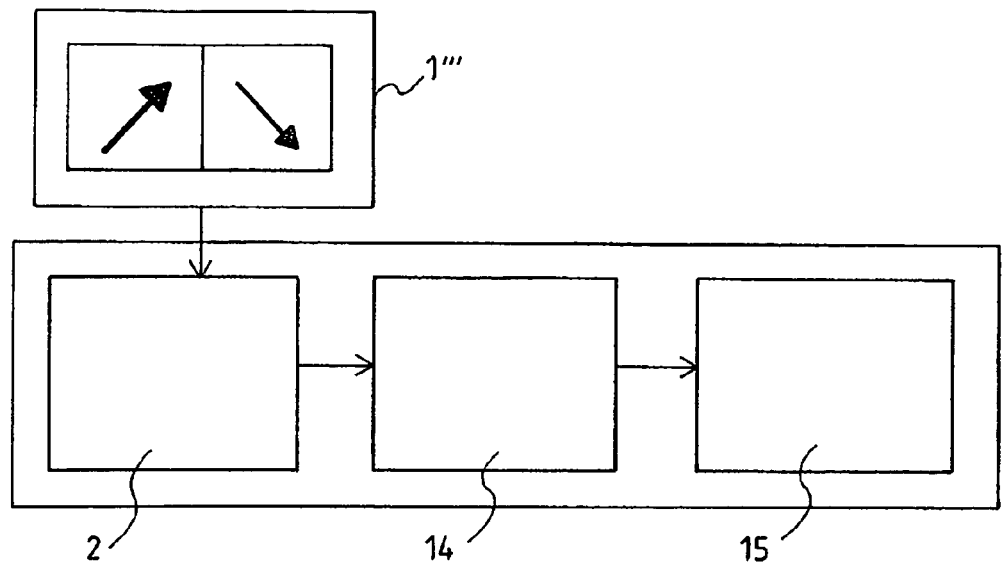
FIG. 7 very schematically illustrates the matching subsystem upline from a low-noise amplifier for an antenna according to the invention.

It is known that the matching band of an antenna increases in direct proportion to its volume. Thus, if the size of an antenna like antenna 1''' is reduced, degradation of its matching level in the bottom part of the spectrum follows. Mismatching losses provoked in this way can be of the order of a few dB and can represent half of the received power. It has been observed that an antenna like antenna 1''' having very good matching levels on its receive part and on the low-noise amplifier linked to this receive part, without taking into account the phase information, has the same performance characteristics as a similar antenna having a degraded matching level on its receive part and with a well matched phase. According to the invention, and by referring to FIG. 7, a matching block 14 (electronic circuit) can be inserted between the switching and phase shifting block 2 and a balanced low-noise amplifier 15 in order to modify the amplitude and phase information in the mismatched area of the signal and therefore to offset the matching losses in the bottom part of the spectrum while maintaining the noise factor performance characteristics to obtain optimal sensitivity. The matching block is used to align the phase of the signal at the output of block 2 with the input of amplifier 15 in such a way as to optimize transmission of the signal and limit the formation of standing waves which reduce matching quality. In addition, it can be used to control the amplitude of the transmitted signal throughout the frequency spectrum and eliminate spurious components. The use of such a matching block 14 provides, given an equivalent performance level, a reduction of approximately 37% in the dimensions of the antenna 1''': the L, W, D dimensions of the parallelepiped then being reduced respectively to 16.9 cm, 10.5 cm and 3.2 cm. This even smaller sized antenna 1''' can then be even more easily built into a portable television like 20.

Figure 8:
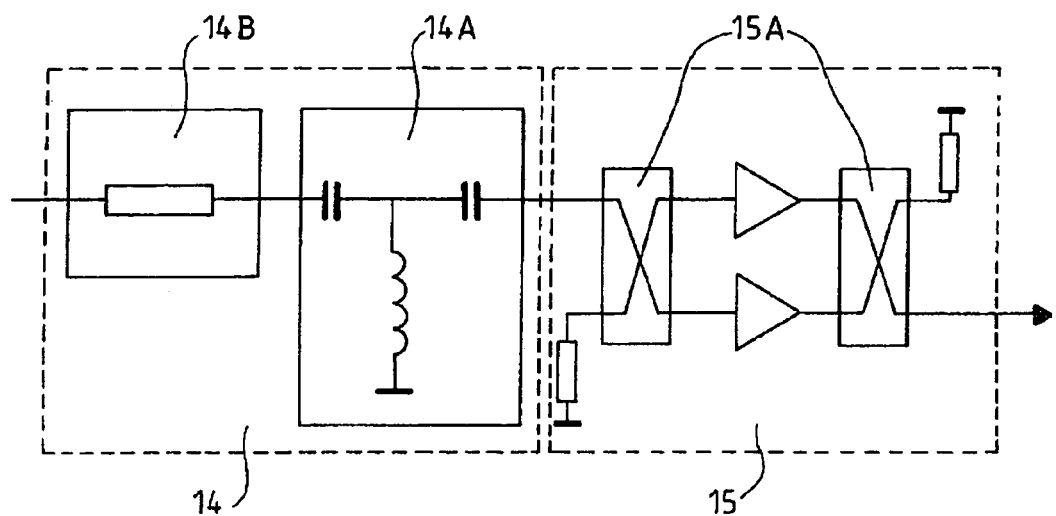
FIG. 8 shows in greater detail an exemplary embodiment of a matching block for an antenna according to the invention.

In FIG. 8, the components of a matching block 14 and a balanced low-noise amplifier 15 are shown in greater detail. The matching block 14 can comprise a high-pass type network 14A responsible for controlling the matching of the low-noise amplifier 15 in the degraded frequency domain and a passive type phase shifting circuit 14B which can be produced from a simple microstrip line, the function of which is to control the maximum amplitude of mismatches throughout the useful frequency band of the antenna (470 MHz–862 MHz). The use of a balanced type low-noise amplifier 15 means that a low noise level can be retained. The balanced low-noise amplifier 15 shown in FIG. 8 is based on the use of hybrid couplers 15A at the input and output of the amplifier which optimize the matching parameters and reduce the noise figure by enabling standing waves to be discharged. The physical parameters of such a compensation system, the dimensional parameters of the microstrip line (length and width) and the matching compensation parameters (capacitances, inductance) can be calculated using a "Random" or "Gradient" type optimization algorithm known to those skilled in the art.

It is understood that the use of a matching block like 14 can be extended to the antenna embodiments 1, 1' and 1" to obtain a small-size antenna, operating with polarization diversity and offering a good matching level throughout the entire UHF receive spectrum.

As described above, these antennas 1, 1', 1", 1''' can be produced by moulding a plastic and plating the outer surfaces that one obtained from moulding and define the radiating elements and the ground planes. They can also be produced in foam technology, in other words by hollowing out a block of foam and plating the interior surface of the hollowed-out spaces obtained in the block of foam. The foam technology offers the advantage of providing light antennas.

What is claimed is:

1. A polarization diversity antenna, comprising two separate radiating elements, each radiating element being coupled through a port to a probe, the probes being oriented at 90° to each other and at 45° to a horizontal plane, the two ports being linked to a broadband switching and phase shifting circuit controlled to supply a polarization diversity signal at the output.

2. An antenna according to claim 1, wherein it comprises two radiating elements in the form of two coplanar radiating half-discs, the edges of which are oriented at 90° to each other, each probe extending along the edge of a half-disc.

3. An antenna according to claim 2, wherein each radiating element in the form of a half-disc is coupled to a cone-shaped ground plane.

4. An antenna according to claim 1, comprising two radiating elements in the form of two radiating spheres, the axes of revolution of which are oriented at 90° to each other, each probe extending along the axis of revolution of a radiating sphere.

5. An antenna according to claim 4, wherein each radiating element in the form of a sphere is coupled to a cone-shaped ground plane.

6. An antenna according to claim 1, wherein the radiating element is divided into two mechanically separate parts designed to be incorporated respectively in the right and left sides of a television in order to produce spatial diversity.

7. An antenna according to claim 1, further comprising a balanced low-noise amplifier linked to the broadband switching and phase shifting circuit via a matching circuit designed to offset matching losses in the bottom part of the antenna's receive spectrum.

8. An antenna according to claim 7, wherein the matching circuit comprises a high-pass network designed to control the matching of the low-noise amplifier in the degraded frequency domain and a passive phase shifting circuit designed to control the maximum amplitude of mismatches throughout the antenna's useful frequency band.

9. An antenna according to claim 8, wherein the passive phase shifting circuit is a microstrip line.

10. An antenna according to claim 7, wherein the balanced low-noise amplifier comprises hybrid couplers at the input and at the output.

11. A polarization diversity antenna comprising a radiating element, said radiating element being coupled through two ports to two probes, the probes being oriented at 90° to each other and at 45° to a horizontal plane, the two probes being linked to a broadband switching and phase shifting circuit controlled to supply a polarization diversity at the output.

12. An antenna according to claim 11, wherein the radiating element takes the form of a radiating discs, the the two probes extending radially to the circumference of the radiating disc, at 90° to each other.

13. An antenna according to claim 12, wherein the radiating element in the form of a disc is coupled to a ground plane formed by two discs that are coplanar to each other and with the disc forming the radiating element.

14. An antenna according to claim 11, further comprising a balanced low-noise amplifier linked to the broadband switching and phase shifting circuit via a matching circuit designed to offset matching losses in the bottom part of the antenna's receive spectrum.

15. An antenna according to claim 14, wherein the matching circuit comprises a high-pass network designed to control the matching of the low-noise amplifier in the degraded frequency domain and a passive phase shifting circuit designed to control the maximum amplitude of mismatches throughout the antenna's useful frequency band.

16. An antenna according to claim 15, wherein the passive phase shifting circuit is a microstrip line.

17. An antenna according to claim 16, wherein the balanced low-noise amplifier comprises hybrid couplers at the input and at the output.

* * * * *